United States Patent
Das Gupta et al.

(10) Patent No.: US 10,341,463 B2
(45) Date of Patent: Jul. 2, 2019

(54) SYSTEM AND METHOD FOR MESSAGE QUEUE CONFIGURATION IN A NETWORK

(71) Applicant: INTERNATIONAL BUSINESS MACHINES CORPORATION, Armonk, NY (US)

(72) Inventors: Rudranil Das Gupta, Kolkata (IN); Erik Houlberg, Hvidovre (DK); Jorgen B. Kristensen, Herlev (DK); Anders Raasted, Helsinge (DK)

(73) Assignee: International Business Machines Corporation, Armonk, NY (US)

(*) Notice: Subject to any disclaimer, the term of this patent is extended or adjusted under 35 U.S.C. 154(b) by 61 days.

(21) Appl. No.: 15/585,372

(22) Filed: May 3, 2017

(65) Prior Publication Data
US 2018/0324277 A1 Nov. 8, 2018

(51) Int. Cl.
*H04L 29/08* (2006.01)
*H04L 12/863* (2013.01)

(52) U.S. Cl.
CPC ........ *H04L 67/322* (2013.01); *H04L 47/6215* (2013.01); *H04L 67/10* (2013.01)

(58) Field of Classification Search
CPC ... H04L 67/322; H04L 47/6215; H04L 67/10; G06F 9/546; G06F 11/0751; G06F 11/0769; G06F 2209/548; Y04S 10/54
See application file for complete search history.

(56) References Cited

U.S. PATENT DOCUMENTS

| | | | |
|---|---|---|---|
| 7,242,991 B2* | 7/2007 | Budinger | G05B 19/41865 700/95 |
| 8,336,057 B2 | 12/2012 | Shirgaonkar | |
| 8,627,333 B2 | 1/2014 | Chen et al. | |
| 8,639,965 B1 | 1/2014 | Anugu et al. | |
| 8,898,520 B1* | 11/2014 | Ford | G06F 9/546 714/15 |
| 2003/0182464 A1* | 9/2003 | Hamilton | G06F 9/546 719/314 |
| 2005/0060374 A1* | 3/2005 | Phillips | G06F 9/546 709/206 |
| 2005/0138081 A1* | 6/2005 | Alshab | G06Q 10/06 |
| 2010/0017441 A1* | 1/2010 | Todd | G06F 9/546 705/7.28 |
| 2015/0189030 A1* | 7/2015 | Li | H04L 51/18 709/217 |

(Continued)

OTHER PUBLICATIONS

Houlberg, Erik; MQ Best Practice; IBM Work in Progress; 34 pages.
(Continued)

*Primary Examiner* — Sargon N Nano
(74) *Attorney, Agent, or Firm* — Schmeiser, Olsen & Watts, LLP; Mark Vallone

(57) ABSTRACT

The present invention provides a method, and associated computer system and computer program product, for optimizing and updating a message queuing system by comparing a current message queuing configuration with various message queuing configurations stored in a database, prioritizing the various configurations based upon a criticality level of components, objects and connections, and submitting a prioritized list of suggested configurations for consideration for implementation into the current message queuing system.

14 Claims, 6 Drawing Sheets

(56) References Cited

U.S. PATENT DOCUMENTS

2015/0281004 A1* 10/2015 Kakadia ............... H04L 41/147
370/235
2015/0381709 A1* 12/2015 Word ..................... H04L 49/90
709/203

OTHER PUBLICATIONS

Bhushan, Bharat et al.; High Availability in WebSphere Messaging Solutions; IBM Redbooks; 2010; 268 pages.
Hiscock, Mark et al.; Understanding high availability with WebSphere MQ; IBM Whitepaper; May 11, 2005; 34 pages.
Wyatt, T. Rob; Mission: Messaging: WebSphere MQ cluster design and operation; IBM developerWorks; May 9, 2009; 9 pages.
Xhang, Z. et al.; A cloud queuing service with strong consistency and high availability; IBM Journal of Research and Development, vol. 55, Issue 6; Nov.-Dec. 2011; pp. 10:1-10:12.
Andrei Iancu, "Remarks by Director Iancu at the Intellectual Property Owners Association 46th Annual Meeting", Sep. 24, 2018, Chicago, Illinois, retrieved on Nov. 18, 2018 from the Internet: <https://www.uspto.gov/about-us/-news-updates/remarks-director-iancu-intellectual-property-owners-46th-annual-meeting>, 7 Pages.

* cited by examiner

SYSTEM AND METHOD FOR MESSAGE QUEUE CONFIGURATION IN A NETWORK

TECHNICAL FIELD

The invention relates generally to the field of managing message queues in a network, and in particular to a method and system for optimizing message queue configurations.

BACKGROUND

Prior art systems and methods fail to accurately predict the resilience and consistency of a message queue system within a computer network. Accordingly, there is a need for improved systems and methods to manage and optimize message queue configurations.

SUMMARY

The present invention provides a method, and associated computer system and computer program product, for optimizing and updating a message queuing system by comparing a current message queuing configuration with various message queuing configurations stored in a database, prioritizing the various configurations based upon a criticality level of components, objects and connections, and submitting a prioritized list of suggested configurations for consideration for implementation into the current message queuing system.

A method, implemented by a server, for setting a message queuing system configuration includes: determining criticality levels of different combinations of message queuing system configuration data based upon business criteria; periodically gathering and storing information from the message queuing system, including current message queuing configuration data, current message queuing usage values and current server usage values; periodically analyzing the current message queuing system configuration by comparing the current message queuing configuration data, current message queuing usage values and current server usage values with historical data from a database; and providing suggestions of different configurations for the current message queuing system based upon the analysis and comparison of the configuration and usage data. The central server prioritizes the suggested different configurations of the current message queuing system based upon criticality levels and then can update the current message queuing system configuration from a prioritized list of the suggested different configurations with a highest criticality level at a top of the list. The suggested configuration with the highest criticality level can be applied, wherein the highest criticality level signifies an object requiring first attention when a problem is identified in the message queuing system.

DETAILED DESCRIPTION

Figure 1:
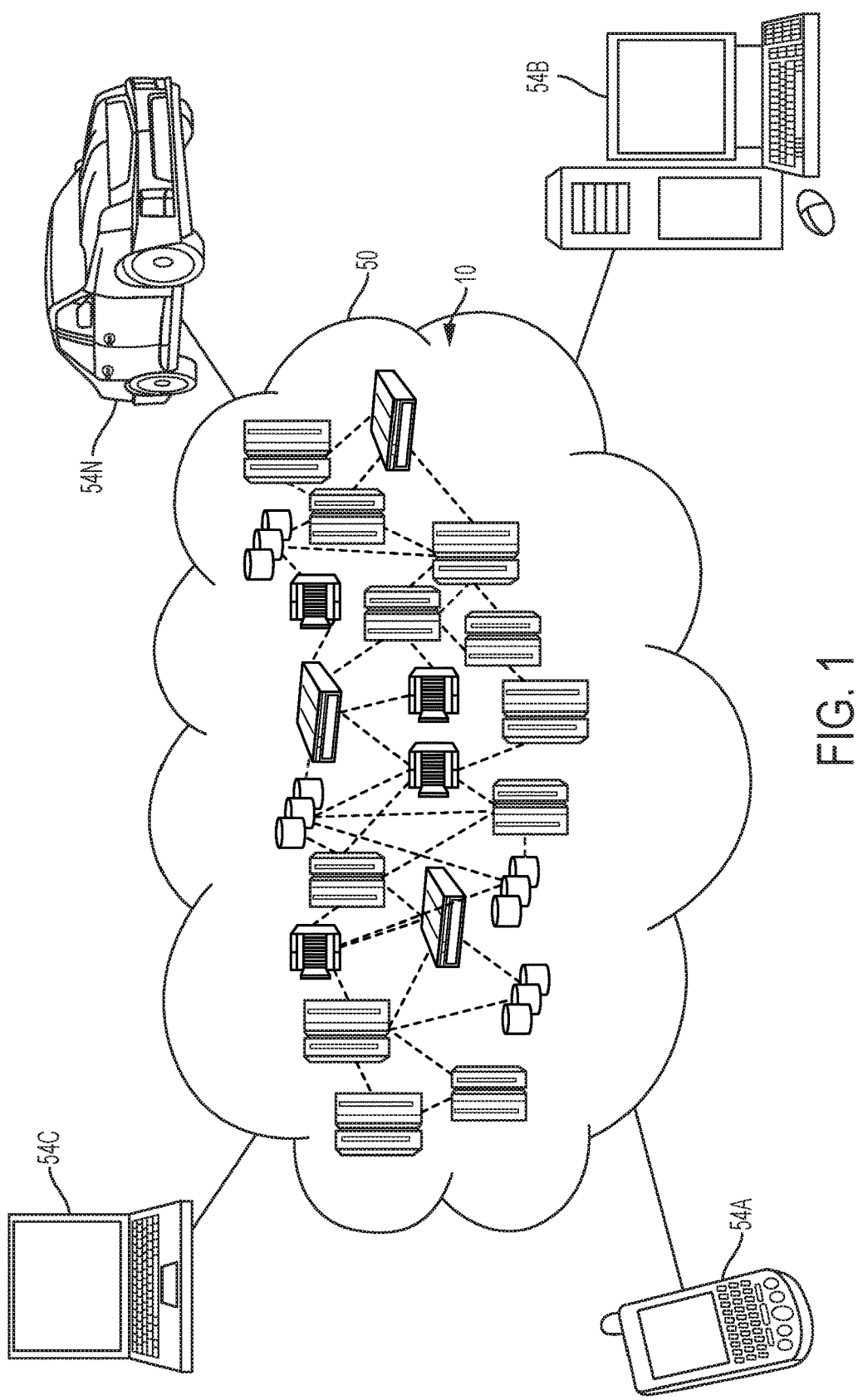
FIG. 1 depicts a cloud computing environment according to an embodiment of the present invention.

In the following description, specific details are set forth although it should be appreciated by one of ordinary skill that the present invention can be practiced without at least some of the details. In some instances, known features or processes are not described in detail so as not to obscure the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
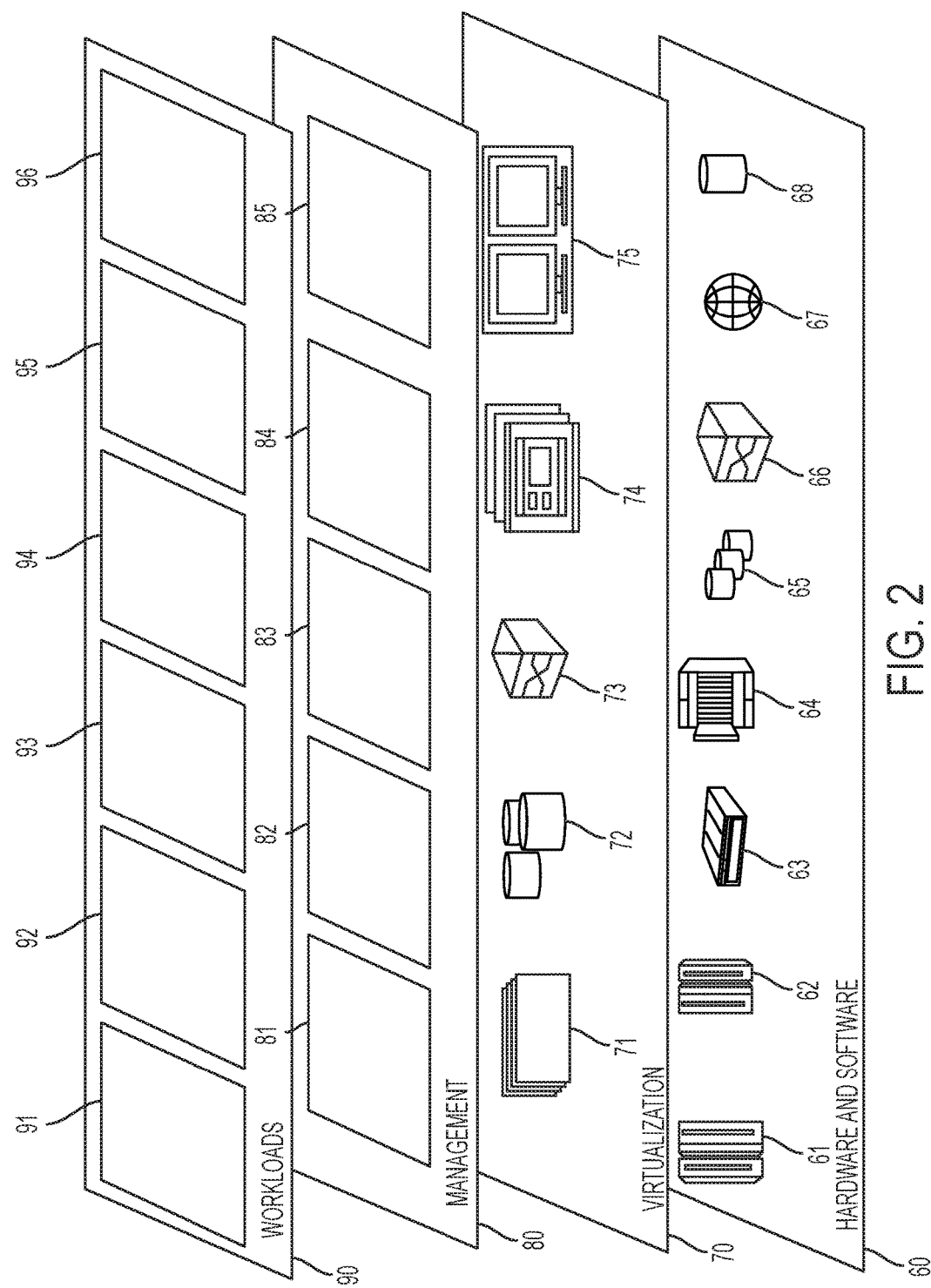
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and prioritizing, recommending and updating a message queuing system 96.

A message queuing system of a network passes messages between applications or program objects, allowing them to work with each other, and allowing objects and systems running on different computers (e.g. via the Internet) to interact. Message passing may be implemented by various mechanisms, including channels, connections and interfaces which provide models for interprocess communication and synchronization of message passing. Various applications or programs perform coordinated functions, tasks and activities required or desired by the system or the users.

A message queue is defined as a list or collection of data in which messages within the collection are kept in a particular order. A message queue is a linear data structure for an abstract sequential collection. Moreover, message queues are software components used for inter-process communication (IPC), or for inter-thread communication within the same process.

Message queues provide an asynchronous communications protocol meaning that the sender and receiver of the message do not need to interact with the message queue at the same time. Messages placed onto a message queue are stored until the recipient retrieves them or the message expires. Message queues have implicit or explicit limits on the size of data that may be transmitted in a single message and the number of messages that may remain outstanding on the queue.

Many implementations of message queues function internally within an operating system or within an application. Such queues exist for the purposes of that system only. Other message queue implementations allow the passing of messages between different computer systems to allow connections between multiple applications and operating systems. These message queuing systems typically provide functionality to ensure that messages do not get lost or misplaced in the event of a system failure. Implementations often exist as proprietary software provided via a service, open source software, or a hardware-based solution. Cloud-based message queuing service options are also available.

In a typical message queuing implementation, a system administrator installs and configures message queuing software which sets up a message queue manager or broker, and defines or names a message queue. An application will register a software routine that watches for messages placed onto the message queue. Second and subsequent applications may connect to the message queue and transfer messages to it. The queue-manager software will store the messages until a receiving application connects and calls the registered software routine or the message expiry time is reached. The receiving application thereupon processes the received message in an appropriate manner. The above described message queuing implementation can also be done via a message queuing service.

Terms used in discussing the passing of messages to and from message queues include the following list which have substantial effects on the reliability and efficiency of a message queuing system.

Durability whereby messages may be kept in memory, they may be written to a dish, or they may be stored in a database.

Security policies to address which applications will have access to which messages within a message queue.

Message purging policies to define the lifespan of a message or message queues, or when a message or message queue should be deleted.

Message filtering per predefined criteria to allow only certain messages to be communicated, accessed or viewed.

Delivery policies to determine whether delivery confirmation of a message is necessary.

Routing policies to determine which servers can access a certain message queue, manager or message.

Batching policies to determine whether messages are delivered immediately, at a given time, or after a delay.

Receipt notification to notify a publisher when some or all subscribers of a service have received a message.

Mechanisms to predict the resilience and consistency for a message queuing setup with respect to an application setup are currently unavailable. For any given application if there is a message queuing problem/issue, then the application impact can be very high depending upon the middleware setup that is present.

Middleware, i.e. message-oriented middleware or MOM, is software or hardware infrastructure supporting the transmission and receiving of messages between distributed systems. The middleware allows application modules to be distributed over heterogeneous platforms and reduces the complexity of developing applications that span multiple operating systems and network protocols. The middleware creates a distributed communications layer that insulates applications from the details of various operating systems and network interfaces.

There are multiple symptoms of problems that can be detected in advance from a message queuing standpoint which can help to increase the stability within the message queuing system as well as indirectly improving the stability of associated applications. For any application involved in message queuing setup, there are certain best practices that can be followed. However after the application is setup and becomes operational, there is a need for techniques to help sustain the stability of the application by taking care of the message queuing consistency and resilience that could alter over time.

Once an application is configured with message queuing capability, there are few safeguards to ensure long term consistency, reliability and resilience of the message queuing setup. The message queuing system configuration should be checked periodically to ensure proper operation. A knowledge base, i.e. database, is desirable to store historical data of message queuing and related system parameters when message queuing is deployed. This knowledge base becomes more application intelligent over time with the accumulation of different message queuing configurations.

A network, cloud environment or computer system incorporating a message queuing system includes a central server which periodically gathers information about the network and the corresponding message queuing system. The central server gathers and stores information into a database, and performs a number of duties as described hereafter.

The central server checks the network consistency of the message queuing system to ensure that connection channels between message queues within the system are operational with proper internet protocol IP addresses for packet exchange. Possible network outages or fluctuations that can effect the message queuing settings are updated in the database so that the data is available when necessary for periodic updates.

The central server also checks the object consistency of message queuing with respect to queue manager details, dead letter queue configurations and queue limits. The parameters within the database are updated to ensure object consistency. There typically can not be one single set of fixed parameters that would work properly for all applications running in the network, since every application has its own features, requirements and behavior. Thus parameters effecting various applications would be updated into the database over time during periodic checks by the processor of the central server. For example a number of users of the network/system could change, or behavioral parameters of a running application with respect to certain business objectives could change.

A dead letter queue allows software developers to look for common patterns and potential software problems by storing messages that meet one or more of the following criteria.

A message is sent to a queue that does not exist.

The queue length limit of the message queue is exceeded.

The message length limit exceeded.

The message is rejected by another queue exchange.

The message reaches a threshold read counter number, because it is not consumed.

Figure 4:
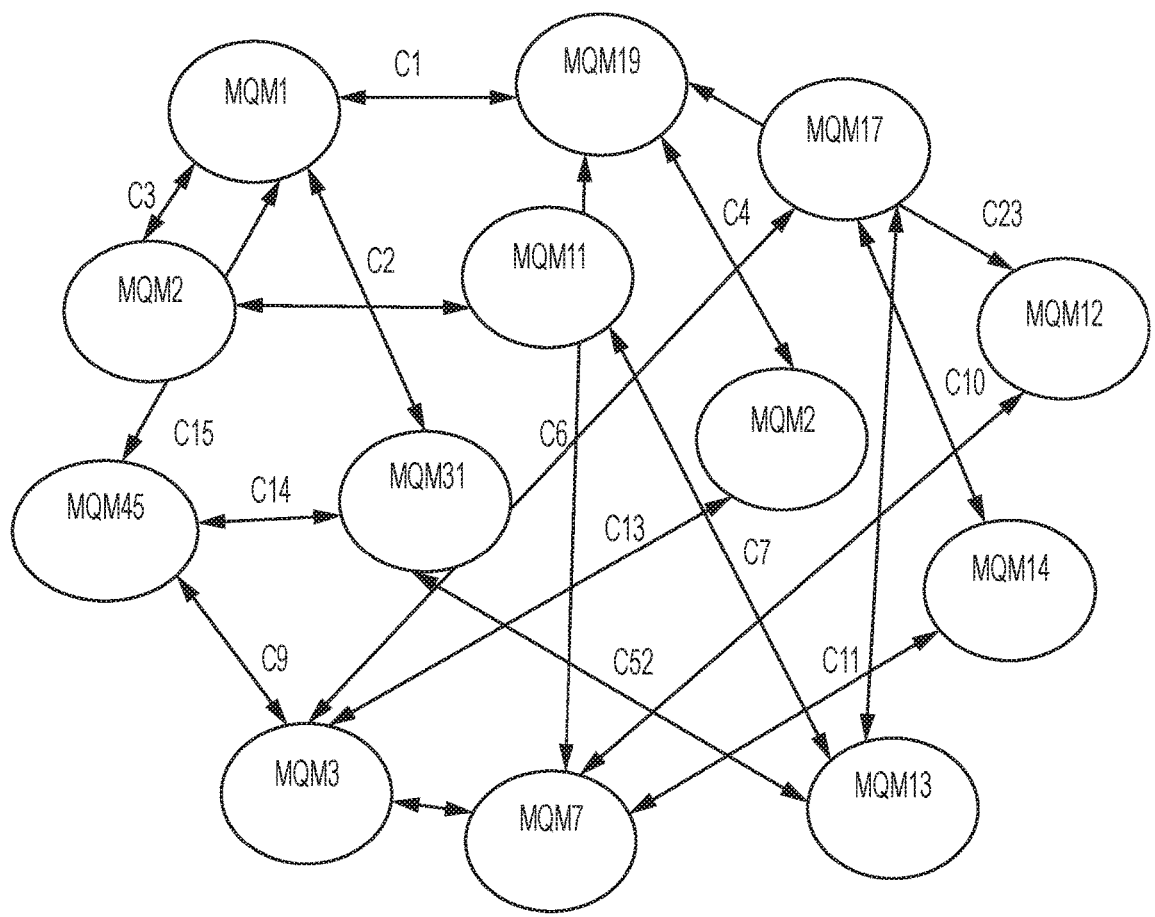
FIG. 4 is a matrix representation of a message queuing system in accordance with embodiments of the present invention.

The central server creates a connection matrix of queue manager connections as illustrated in FIG. 4 and cross-referenced in TABLE I below to identify and categorize all of the connections between message queue managers in the system.

TABLE I

| Object 1 | Object 2 | Connection Name | Criticality Level |
| --- | --- | --- | --- |
| MQM1 | MQM19 | C1 | High |
| MQM7 | MQM19 | C6 | Medium |
| MQM45 | MQM31 | C14 | Medium |
| MQM17 | MQM14 | C10 | Low |

The exemplary matrix of FIG. 4 and TABLE I are presented as partially-filled examples of a matrix and table for a message queuing system. Every connection/channel between two queue managers is important for full operation of the message queuing system, however certain connections are more critical than others in that problems (aka incidents or issues) associated with those connections could potentially cause a network or message system to shutdown. Hence the criticality level of each connection between select message queue managers is logged as shown in TABLE I.

The parameters listed on the exemplary table can include any object which effects the message queuing system such as, but not limited to, a message queue manager, a message queue, a channel, connection, interface, cluster or logical message queuing entity.

Problems related to an application define the most critical nodes having a highest criticality level which is stored in the data base and used to identify the nodes that are most critical to handle first whenever there is an issue. This prioritization makes the identification and debugging of an issue much faster and more accurate, and it ensures that the message queuing configuration acknowledges nodes which are most critical to be handled first in problem solving in order to maintain optimal reliability of operation of the message queuing system.

Over time the database is populated with more and more information about various parameters which effect the message queuing system and related network applications. When a problem occurs that negatively effects the system, its criticality is categorized based upon historical data. For instance, if a problem or incident effecting the proper communications via connection C1 between message queue manager 1 (MQM1) and MQM19 could result in the entire message queuing system being shut down, then the criticality level for C1 would be set to "High" as shown in TABLE I. However, if a problem with message queuing between MQM17 and MQM14 via connection C10 has a minimal or negligible effect on the network, then the criticality level for C10 would be set to "Low" as shown. In any event, the knowledge base database is populated over time and the criticality levels are categorized based upon problems effecting specific applications.

The central server performs file system verification by checking various parameters of the file system such as disk space or memory capacity and disk consistency. Appropriate actions must be taken by the server to prevent file system parameters from negatively impacting the message queuing consistency. For instance, the knowledge base could include time-stamped data to indicate certain periods of time during a day/week/month (e.g. during a backup procedure) when an application typically experiences increases in data volume or cache volume so that the system can take appropriate actions to prevent message queuing disruptions.

The central server checks the central processing unit CPU of the central server as well as thread information in order to provide an alert when there is an indication that the monitored parameters could disrupt the message queuing performance. The data base is updated with optimal application-specific parameters needed for the message queuing system to perform efficiently.

Each time there is a problem or related issue which effects the message queuing system, the corrective action taken to remedy the problem is noted. The issues and corrective actions taken are then updated in the knowledge base so that the same or a similar corrective action can be recommended as soon as a similar issue occurs.

Based on the parameters mentioned above and the knowledge base when a problem occurs, the message queuing system issues or flags an alert as soon as possible so that the message queuing administrator and other related administrators can take necessary corrective actions and ensure that the application does not go down by compromising the message queuing consistency and resilience. The recommended corrective action can also be recommended in the form of a user readable report.

Improvements over prior art message queuing systems are listed below.

1) Predicting the resilience and consistency of a specific message queuing setup/configuration and suggesting taking the necessary corrective actions to ensure the resilience and consistency of the system;

2) Analyzing use patterns such as message queuing object consistency and matrix connection checks of message queuing links;

3) Adaptability of message queuing to changing applications, as well as appropriate notification and implementation of corrective actions. Changes in the business dynamics of an application can be identified and stored in the knowledge base when periodically polling or gathering information for the message queuing system; and 4) An application specific message queuing configuration is created, updated or recommended for current applications to ensure reliability and resilience.

Figure 5:
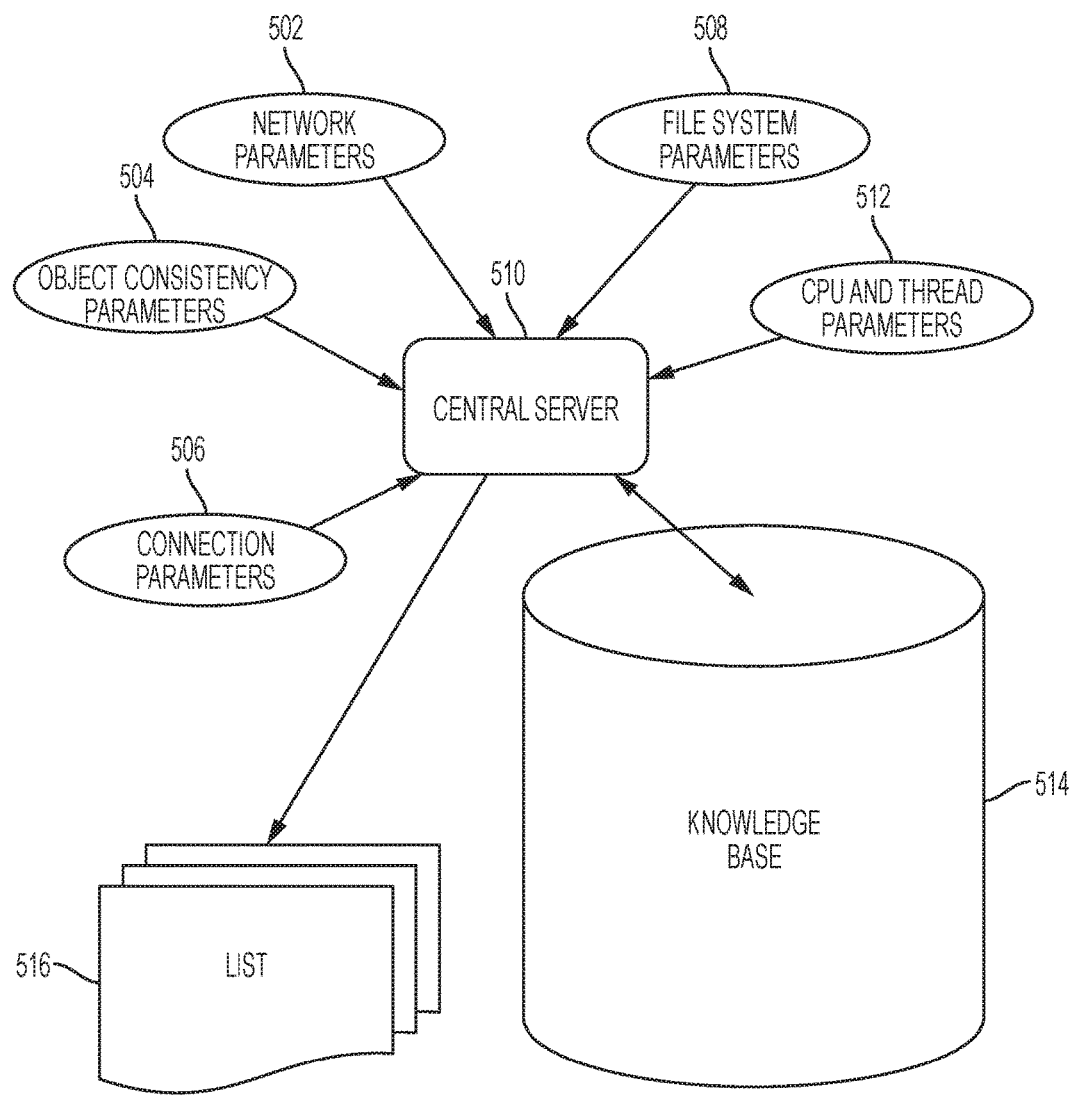
FIG. 5 is a diagrammatic representation of parameters used in an implementation of a method of a message queuing system in accordance with embodiments of the present invention.

FIG. 5 is a diagrammatic representation of parameters used in an implementation of a method of a message queuing system in accordance with embodiments of the present invention. The message queuing system operates under the direction of a central server 510 of a computer network whereby the central server 510 gathers information from the 5 areas listed below:

1) Network parameters;
2) Object consistency parameters;
3) Connection parameters (between queue managers);
4) File system parameters; and
5) CPU and thread parameters.

Network Parameters

The server checks all sender channels, sender cluster channels, and receiver channels for proper configuration of network parameters 502. For example, the Fully Qualified Domain Name (FQDN) for each channel is checked to determine whether it can be resolved to a numeric IP address which is then pinged to make sure it's working properly. If the IP address cannot be pinged or the FQDN cannot be resolved, then a flag, message or alert warns a system administrator that the message queuing is failing. Factors such as slow network response times and power outages are additional factors that could lead to the failure of message queuing.

Object Consistency Parameters

In order to ensure object consistency, object consistency parameter 504 is configured and checked to determine:

a. Whether a queue manager has a dead letter queue;

b. Whether the dead letter queue has a specified maximum message length that is less than equal to the specified maximum message length of the queue manager;

c. Whether any channels, specially receiver channels, have a specified maximum message length that is greater than the specified maximum length of the queue manager; and d. Whether there is a reference from object 1 to object 2 and if so, then confirming that both objects exist.

Connection Parameters

As previously described with respect to FIG. 4 and TABLE I above, a priority list of connection parameters 506 between various queue managers can be created based upon the behavior of applications. The priority list is sorted and the most critical of the connections are checked first to ensure that any problem to the application with respect to the queue manager is resolved quickly. This cognitive recognition and solving by prioritization of criticality levels within the message queuing system enables predictions of the most important and frequent causes of failures, and further provides suggestions of most effective corrective actions. The matrix of FIG. 4 and the accuracy of the criticality levels of various objects and connections will mature with updates over time and will take into consideration the application feedback data to the message queue. Corrective actions for the message queuing system are appropriately applied. The system periodically updates the priority list of TABLE I which includes the criticality levels of objects and connections. Hence, changes in the business dynamics of the application can be identified and the message queuing system will mature.

File System Parameters

File system parameters 508 such as, but not limited to, file system capacity and outages can affect the message queuing setup/configuration. A file system monitoring application can be used to provide inputs to the central server which in turn will make decisions based upon the message queue. This includes file system checks that are relevant for message queuing only that would be done in order to make the appropriate decisions on increasing the message queuing stability and in turn the application stability.

CPU and Thread Parameters

Message queuing behavior is greatly influenced by CPU and thread behavior, thus CPU and thread parameters 512 such as CPU usage monitoring and thread monitoring are performed in a message queuing system.

A thread is defined as the smallest sequence of programmed instructions that can be managed independently such as by a message queue manager as part of an operating system. The implementation of threads and processes differs between operating systems, but in most cases a thread is a component of a process. Multiple threads can exist within one process, executing concurrently and sharing resources such as memory, while different processes do not share these resources. In particular, the threads of a process share its executable code and the values of its variables at any given time.

Systems with a single processor generally implement multi-threading by time slicing whereby the CPU switches between different software threads. On a multi-processor or multi-core system, multiple threads can execute in parallel with every processor or core executing a separate thread simultaneously. On a processor or core with hardware threads, separate software threads can also be executed concurrently by separate hardware threads.

The CPU and thread monitored data is provided to the central server which in turn makes decisions based upon the message queue. Some CPU and thread specific checks are relevant for message queuing only so that the central server can make appropriate decisions on increasing the message queuing stability and in turn the application stability.

The central server receives message queuing data, including configuration data, from the database or knowledge base 514 which includes:

1) Node connection criticality details;

2) Specific parameters for optimal message queuing object consistency;

3) Optimal file system and CPU/thread parameters;

4) Network information and outage details;

5) Mapping of issue resolution details for past incidents; and

6) Details of all incidents that were caused due to message queuing.

The central server makes a list 516 of recommendations and actions based upon all of the above inputs and data from the knowledge base 514 whereby the system administrators can take action to improve the reliability of the message queuing system and in turn the application stability. Reports can be provided and customized in any format for the user or system administrator.

Figure 3:
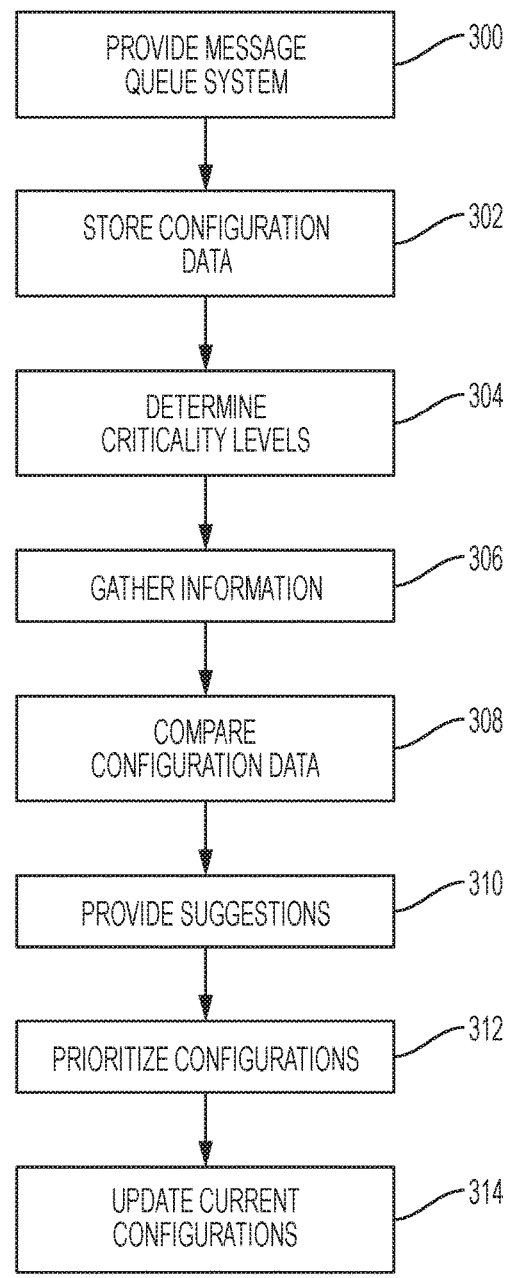
FIG. 3 is a flowchart diagram of a method in accordance with embodiments of the present invention.

FIG. 3 is a flowchart diagram of a method in accordance with embodiments of the present invention whereby a processor of a central server of the network or system implements the inventive process as follows.

In step 300 a message queue system is provided which includes a plurality of interconnected message queue managers each managing one or more message queues whereby each message queue is connected to one or more different message queue managers via a respective interface. An interface uses one or more channels for connections between the respective message queue managers. Interface, channel and connection can be used interchangeably for the purpose of describing the current invention.

Configuration data of objects of a message queuing system includes message queue managers, message queues, channels and interfaces which are stored in a database of the central server in step 302. In step 304 the criticality levels of different combinations of message queuing system configuration data are determined based upon business criteria. For instance, if the business criteria prioritizes that a specific message queue must always be operational without interruption or shut-down, then a High criticality level will be assigned to related configuration data, objects and connections required to ensure the operation of the message queue.

In step 306 the central server will periodically gather information from the message queuing system, including current message queuing configuration data, current message queuing usage values and current server usage values, then store the gathered information into the database of the central server. The database can be located anywhere. Also the time intervals for gathering information could vary, e.g. every hour, once per day, once per week, twice per week, once a month, etc. according to the requirements or constraints of scheduling for a particular system.

The gathered information is analyzed in step 308 by comparing the most recently gathered current message queuing configuration data, current message queuing usage values, current server usage values and/or other object values related to message queuing with corresponding data which has been previously stored on the database as historical data representing various objects and configurations in the past. Based upon the analysis and comparison of current message queue system configuration and usage data versus historical data, the central server will provide suggestions in step 310 of various different configurations for the current message queuing system. The suggested configurations can be prioritized in step 312 as previously shown in TABLE I whereby the suggested different configurations of the current message queuing system are prioritized based upon the criticality levels of each suggested configuration.

Finally in step 314 the current message queuing system configuration can be updated from the prioritized list of the suggested configurations which includes a highest criticality level at a top of the list. Typically the suggested configuration with an object having the highest criticality level will be used to replace the current configuration. The highest criticality level signifies an object requiring first attention when a problem is identified in the message queuing system, so by using the priority configuration the system will be postured with awareness of proper maintenance to keep the message queuing system and related applications at an optimal operational level.

Debugging, awareness and correction of an issue, incident or problem in the message queuing system according to the inventive method will enlighten the server or other applications and devices to prioritize the problem solving by requiring first attention to the problem as identified by the highest criticality level. The central server will periodically: check and confirm operations, fluctuations and outages in packet communications between sender and receiver channels of the network; check and confirm the objects of the current message queuing system configuration data; and check and confirm file system parameters of the network effecting the current message queue system, such as but not limited to, memory capacity, processing capacity, and disk consistency. Moreover the server will check and confirm handling of message queue threads of the message queue system.

Figure 6:
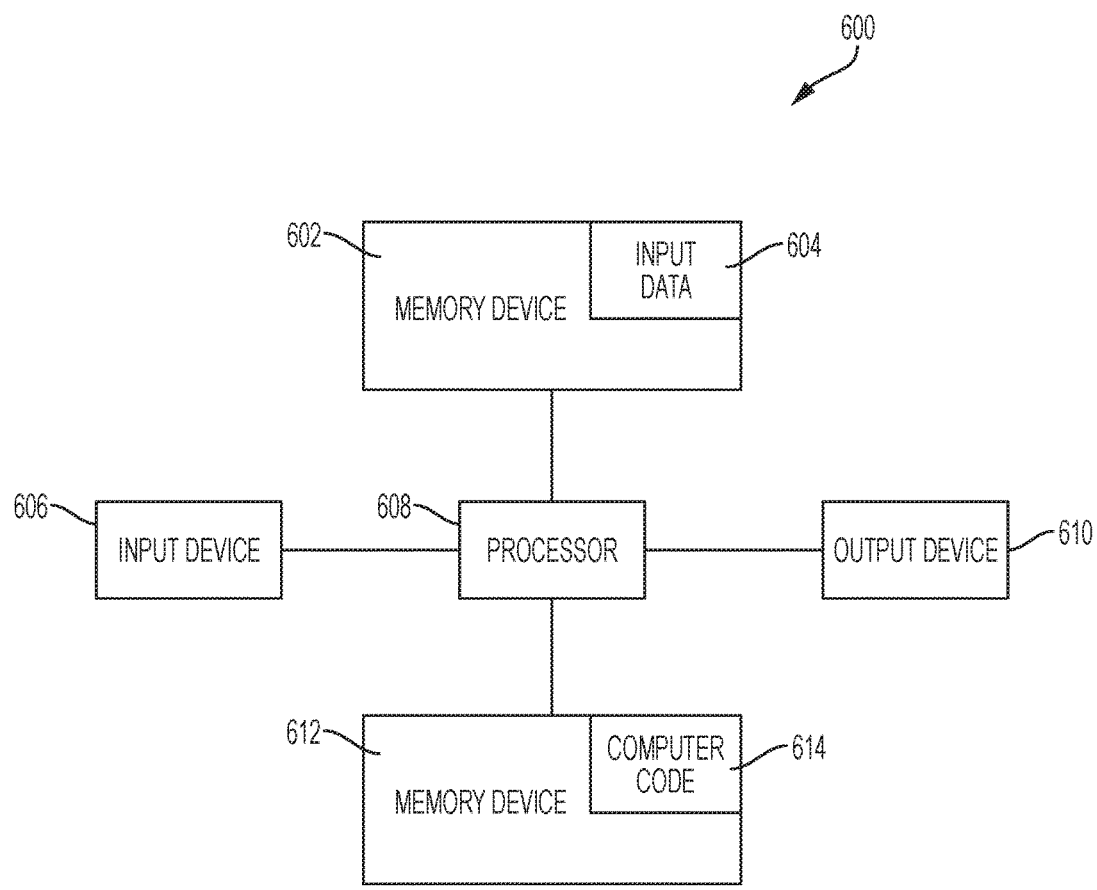
FIG. 6 is a block diagram of a computer system for implementing a method in accordance with embodiments of the present invention.

FIG. 6 is a block diagram of a computer system for implementing a method in accordance with embodiments of the present invention. A central server 600 includes a processor 608, an input device 606 coupled to the processor 608, an output device 610 coupled to the processor 608, and memory devices 602 and 612 each coupled to the processor 608. The input device 606 may be, inter alia, a keyboard, a mouse, etc. The output device 610 may be, inter alia, a printer, a plotter, a computer screen, a magnetic tape, a removable hard disk, a floppy disk, etc. The memory devices 602 and 612 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 612 includes a computer code 614 which is a computer program that includes computer-executable instructions. The computer code 614 includes software or program instructions that may implement an algorithm for implementing methods of the present invention. The processor 608 executes the computer code 614. The memory device 602 includes input data 604. The input data 604 includes input required by the computer code 614. The output device 610 displays output from the computer code 614. Either or both memory devices 602 and 612 (or one or more additional memory devices not shown) may be used as a computer usable storage medium (or program storage device) having a computer readable program embodied therein and/or having other data stored therein, wherein the computer readable program includes the computer code 614. Generally, a computer program product (or, alternatively, an article of manufacture) of the computer system/device 600 may include the computer usable storage medium (or said program storage device). The processor 608 may represent one or more processors. The memory device 602 and/or the memory device 612 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for debugging and attending to a problem in a message queuing system in a computer network, the method comprising:

creating, by a central server, a connection matrix of interconnected message queue managers within the message queuing system, each message queue manager managing one or more message queues, each message queue manager being connected to one or more different message queue managers in the matrix via respective connections, each connection being an interface that uses one or more channels for connecting between respective message queue managers;

storing into a database, by the central server of the network, message queuing system configuration data of objects including the message queue managers, the message queues, channels and interfaces;

determining, by the central server, a critical level of each connection, wherein a highest critical level designation is for a connection whose failure would shut down the message queuing system, and wherein a lowest critical level designation is for a connection whose failure would have a minimal or negligible effect on the message queuing system;

determining, by the central server, criticality levels of different combinations of message queuing system configuration data based upon business criteria;

periodically gathering, by the central server, information from the message queuing system, including current message queuing configuration data, current message queuing usage values and current server usage values, followed by storing, by the central server, the gathered information on the database of the central server;

periodically analyzing, by the central server, a current message queuing system configuration by comparing the current message queuing configuration data, current message queuing usage values and current server usage values with historical data from the database;

providing suggestions, by the central server, of different configurations for the current message queuing system based upon the analysis and comparison of configuration and usage data;

prioritizing, by the central server, the suggested different configurations of the current message queuing system based upon the criticality levels of the suggested different configurations;

updating, by the central server, the current message queuing system configuration from a prioritized list of the suggested different configurations with a highest criticality level at a top of the list, and applying the suggested configuration with the highest criticality level, wherein the highest criticality level signifies an object requiring first attention when a problem is identified in the message queuing system; and debugging, by the central server, the problem according to the prioritized list and attending to the problem requiring first attention as identified by the highest criticality level.

2. The method of claim 1, further comprising: checking and confirming, by the central server, operations, fluctuations and outages in packet communications between sender and receiver channels of the network.

3. The method of claim 1, further comprising: checking and confirming, by the central server, the objects of the current message queuing system configuration data.

4. The method of claim 1, further comprising: checking and confirming by the central server file system parameters of the network effecting the current message queue system, said parameters including memory capacity, processing capacity, and disk consistency.

5. The method of claim 1, wherein the step of periodically gathering information further comprises: checking and confirming, by the central server, handling of message queue threads of the message queue system.

6. A computer program product, comprising one or more computer readable hardware storage devices having computer readable program code stored therein, said program code containing instructions executable by a computing device to implement a method for debugging and attending to a problem in a message queuing system in a computer network, the method comprising:

creating, by a central server, a connection matrix of interconnected message queue managers within the message queuing system, each message queue manager managing one or more message queues, each message queue manager being connected to one or more different message queue managers in the matrix via respective connections, each connection being an interface that uses one or more channels for connecting between respective message queue managers;

storing into a database, by the central server of the network, message queuing system configuration data of objects including the message queue managers, the message queues, channels and interfaces;

determining, by the central server, a critical level of each connection, wherein a highest critical level designation is for a connection whose failure would shut down the message queuing system, and wherein a lowest critical level designation is for a connection whose failure would have a minimal or negligible effect on the message queuing system;

determining, by the central server, criticality levels of different combinations of message queuing system configuration data based upon business criteria;

periodically gathering, by the central server, information from the message queuing system, including current message queuing configuration data, current message queuing usage values and current server usage values, followed by storing, by the central server, the gathered information on the database of the central server;

periodically analyzing, by the central server, a current message queuing system configuration by comparing the current message queuing configuration data, current message queuing usage values and current server usage values with historical data from the database;

providing suggestions, by the central server, of different configurations for the current message queuing system based upon the analysis and comparison of configuration and usage data;

prioritizing, by the central server, the suggested different configurations of the current message queuing system based upon the criticality levels of the suggested different configurations;

updating, by the central server, the current message queuing system configuration from a prioritized list of the suggested different configurations with a highest criticality level at a top of the list, and applying the suggested configuration with the highest criticality level, wherein the highest criticality level signifies an object requiring first attention when a problem is identified in the message queuing system; and debugging, by the central server, the problem according to the prioritized list and attending to the problem requiring first attention as identified by the highest criticality level.

7. The computer program product of claim 6, wherein the method further comprises: checking and confirming, by the central server, operations, fluctuations and outages in packet communications between sender and receiver channels of the network.

8. The computer program product of claim 6, wherein the method further comprises: checking and confirming, by the central server, the objects of the current message queuing system configuration data.

9. The computer program product of claim 6, wherein the method further comprises: checking and confirming by the central server file system parameters of the network effecting the current message queue system, said parameters including memory capacity, processing capacity, and disk consistency.

10. The computer program of claim 6, wherein the step of periodically gathering information further comprises: checking and confirming, by the central server, handling of message queue threads of the message queue system.

11. A system, comprising a computing device, said computing device comprising one or more processors, one or more memories, and one or more computer readable hardware storage devices, said one or more hardware storage devices containing program code executable by the one or more processors via the one or more memories to implement a method for debugging and attending to a problem in a message queuing system in a computer network a problem in a message queuing system in a computer network, the method comprising:

creating, by a central server, a connection matrix of interconnected message queue managers within the message queuing system, each message queue manager managing one or more message queues, each message queue manager being connected to one or more different message queue managers in the matrix via respective connections, each connection being an interface that uses one or more channels for connecting between respective message queue managers;

storing into a database, by the central server of the network, message queuing system configuration data of objects including the message queue managers, the message queues, channels and interfaces;

determining, by the central server, a critical level of each connection, wherein a highest critical level designation is for a connection whose failure would shut down the message queuing system, and wherein a lowest critical level designation is for a connection whose failure would have a minimal or negligible effect on the message queuing system;

determining, by the central server, criticality levels of different combinations of message queuing system configuration data based upon business criteria;

periodically gathering, by the central server, information from the message queuing system, including current message queuing configuration data, current message queuing usage values and current server usage values, followed by storing, by the central server, the gathered information on the database of the central server;

periodically analyzing, by the central server, a current message queuing system configuration by comparing the current message queuing configuration data, current message queuing usage values and current server usage values with historical data from the database;

providing suggestions, by the central server, of different configurations for the current message queuing system based upon the analysis and comparison of configuration and usage data;

prioritizing, by the central server, the suggested different configurations of the current message queuing system based upon the criticality levels of the suggested different configurations;

updating, by the central server, the current message queuing system configuration from a prioritized list of the suggested different configurations with a highest criticality level at a top of the list, and applying the suggested configuration with the highest criticality level, wherein the highest criticality level signifies an object requiring first attention when a problem is identified in the message queuing system; and debugging, by the central server, the problem according to the prioritized list and attending to the problem requiring first attention as identified by the highest criticality level.

12. The system of claim 11, wherein the method further comprises: checking and confirming, by the central server, operations, fluctuations and outages in packet communications between sender and receiver channels of the network.

13. The system of claim 11, wherein the method further comprises: checking and confirming, by the central server, the objects of the current message queuing system configuration data.

14. The system of claim 11, wherein the method further comprises: checking and confirming by the central server file system parameters of the network effecting the current message queue system, said parameters including memory capacity, processing capacity, and disk consistency.

* * * * *